US010395219B1

(12) United States Patent
Mentz et al.

(10) Patent No.: US 10,395,219 B1
(45) Date of Patent: Aug. 27, 2019

(54) LOCATION POLICIES FOR RESERVED VIRTUAL MACHINE INSTANCES

(71) Applicant: AMAZON TECHNOLOGIES, INC., Seattle, WA (US)

(72) Inventors: Joshua Dawie Mentz, Cape Town (ZA); Diwakar Gupta, Seattle, WA (US); Georgios Elissaios, Seattle, WA (US); Marnus Freeman, Kuilsrivier (ZA)

(73) Assignee: Amazon Technologies, Inc., Seattle, WA (US)

( * ) Notice: Subject to any disclaimer, the term of this patent is extended or adjusted under 35 U.S.C. 154(b) by 921 days.

(21) Appl. No.: 14/975,406

(22) Filed: Dec. 18, 2015

(51) Int. Cl.
*G06F 9/455* (2018.01)
*G06Q 10/10* (2012.01)

(52) U.S. Cl.
CPC ..... *G06Q 10/1093* (2013.01); *G06F 9/45558* (2013.01); *G06F 2009/4557* (2013.01)

(58) Field of Classification Search
CPC ............ G06Q 10/1093; G06F 9/45558; G06F 2009/4557
See application file for complete search history.

(56) References Cited

U.S. PATENT DOCUMENTS 8,065,676 B1 * 11/2011 Sahai .................... G06F 9/5077 709/226
8,429,276 B1 * 4/2013 Kumar ................ G06F 9/45533 709/226
8,732,699 B1 * 5/2014 Hyser ................... G06F 9/5077 718/1
9,225,661 B1 * 12/2015 Yang ..................... G06F 9/5077
9,262,144 B1 * 2/2016 Apte ......................... G06F 8/60
9,424,063 B2 * 8/2016 Kirubanandam ... G06F 9/45558
9,497,136 B1 * 11/2016 Ramarao ............. G06F 9/45558
9,596,189 B1 * 3/2017 Lea ........................ G06F 17/303
10,069,680 B1 * 9/2018 Wylie ................. H04L 41/0806
2007/0204266 A1 * 8/2007 Beaty .................. G06F 9/45558 718/1
2009/0300614 A1 * 12/2009 Shimogawa .......... G06F 9/4856 718/1
2010/0042723 A1 * 2/2010 Sundarrajan ............ G06F 9/505 709/226
2010/0250744 A1 * 9/2010 Hadad ................... G06F 9/4856 709/226
2010/0333088 A1 * 12/2010 Rogel ................. G06F 9/45533 718/1
2011/0099318 A1 * 4/2011 Hudzia ............... G06F 9/45533 711/6

(Continued)

*Primary Examiner* — Adam Lee
(74) *Attorney, Agent, or Firm* — Blank Rome LLP

(57) ABSTRACT

Apparatus and method are described that relate to reserved virtual machine instances and location policies. Customers of a provider network can reserve one or more reserved virtual machine instances in a reservation and also specify a location policy for the reservation. The location policy provides restrictions as to which hardware may or may not be used to launch the reserved instances and/or how close together the hardware should or should not be to launch the instances of the reservation. The location policies afford customers some degree of control over which hardware is used by the provider network to launch the instances. As such, customers can help control increase security and/or reduce latency of their instances, or control other aspects of their instances.

17 Claims, 7 Drawing Sheets

(56) References Cited

U.S. PATENT DOCUMENTS

2011/0126207 A1* 5/2011 Wipfel .................. H04L 9/3213 718/104
2011/0173329 A1* 7/2011 Zhang .................. G06F 1/3206 709/226
2011/0214005 A1* 9/2011 Biran .................. G06F 11/008 714/1
2011/0231696 A1* 9/2011 Ji .................. G06F 11/1438 714/3
2011/0239215 A1* 9/2011 Sugai .................. G06F 9/45558 718/1
2012/0005344 A1* 1/2012 Kolin .................. H05K 7/20836 709/226
2012/0096460 A1* 4/2012 Sekiguchi .................. G06F 9/45558 718/1
2012/0151490 A1* 6/2012 Zhang .................. G06F 9/5094 718/102
2013/0055252 A1* 2/2013 Lagar-Cavilla .................. G06F 9/5016 718/1
2013/0073730 A1* 3/2013 Hansson .................. G06F 9/5044 709/226
2013/0179289 A1* 7/2013 Calder .................. G06Q 30/08 705/26.3
2013/0179574 A1* 7/2013 Calder .................. G06F 9/5033 709/226
2013/0179881 A1* 7/2013 Calder .................. G06F 9/5072 718/1
2013/0179894 A1* 7/2013 Calder .................. G06F 9/5027 718/104
2013/0179895 A1* 7/2013 Calder .................. G06F 9/5077 718/104
2013/0227127 A1* 8/2013 Takano .................. G06F 9/5044 709/224
2013/0275968 A1* 10/2013 Petev .................. G06F 9/5077 718/1
2013/0283273 A1* 10/2013 Miyazaki .................. G06F 9/45533 718/1
2013/0311988 A1* 11/2013 Boss .................. G06F 9/4862 718/1
2013/0339527 A1* 12/2013 Chowdhry .................. H04L 29/08144 709/226
2013/0339956 A1* 12/2013 Murase .................. G06F 9/505 718/1
2014/0007093 A1* 1/2014 Deshpande .................. G06F 9/45533 718/1
2014/0058871 A1* 2/2014 Marr .................. G06F 9/45533 705/26.1
2014/0068602 A1* 3/2014 Gember .................. G06F 9/45558 718/1
2014/0082165 A1* 3/2014 Marr .................. G06F 9/5044 709/222
2014/0201533 A1* 7/2014 Kruglick .................. H04L 63/062 713/171
2014/0223556 A1* 8/2014 Bignon .................. H04L 63/1441 726/22
2014/0280956 A1* 9/2014 Shu .................. H04L 67/1004 709/226
2014/0297864 A1* 10/2014 Zhang .................. H04L 41/0896 709/226
2014/0380304 A1* 12/2014 Salehi .................. G06F 9/45558 718/1
2015/0058844 A1* 2/2015 Conklin .................. G06F 9/45558 718/1
2015/0188780 A1* 7/2015 Spieser .................. H04L 41/5009 370/252
2015/0220358 A1* 8/2015 Ponsford .................. G06F 9/45533 718/1
2015/0248305 A1* 9/2015 Shu .................. G06F 9/45558 718/1
2015/0317173 A1* 11/2015 Anglin .................. G06F 9/45558 718/1
2015/0355924 A1* 12/2015 Holla .................. G06F 9/45558 718/1
2015/0372878 A1* 12/2015 Ganesan .................. H04L 43/16 709/223
2016/0057074 A1* 2/2016 Jacobs .................. H04L 47/74 709/226
2016/0057214 A1* 2/2016 Anand .................. G06F 9/505 709/226
2016/0150030 A1* 5/2016 Apte .................. H04L 41/5025 709/226
2017/0286146 A1* 10/2017 Voigt .................. G06F 9/5077

* cited by examiner 250
252
254
256
258
260
262
264
266
268
270
Migrate

LOCATION POLICIES FOR RESERVED VIRTUAL MACHINE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Service providers offer virtual machine instances to their customers. Some virtual resources may be reserved on a long-term basis for exclusive use by the customer, while other virtual resources are purchased on an on-demand basis (i.e., when needed). Customers may pay for a reserved instance, for example, with an upfront fee for the instance and then an hourly rate fee during the entire length of the reservation. A customer can buy an on-demand instance only when needed and on-demand pricing may be less than that of reserved instances, but on-demand instances are not guaranteed to be available when needed. The service provider's systems decide on which physical computing devices to launch the virtual machines of its customers. As such, customers generally have no awareness or control as to which physical computing devices in the service provider's network are used to host their instances.

BRIEF DESCRIPTION OF THE DRAWINGS

For a detailed description of various examples, reference will now be made to the accompanying drawings in which.

DETAILED DESCRIPTION

Figure 1:
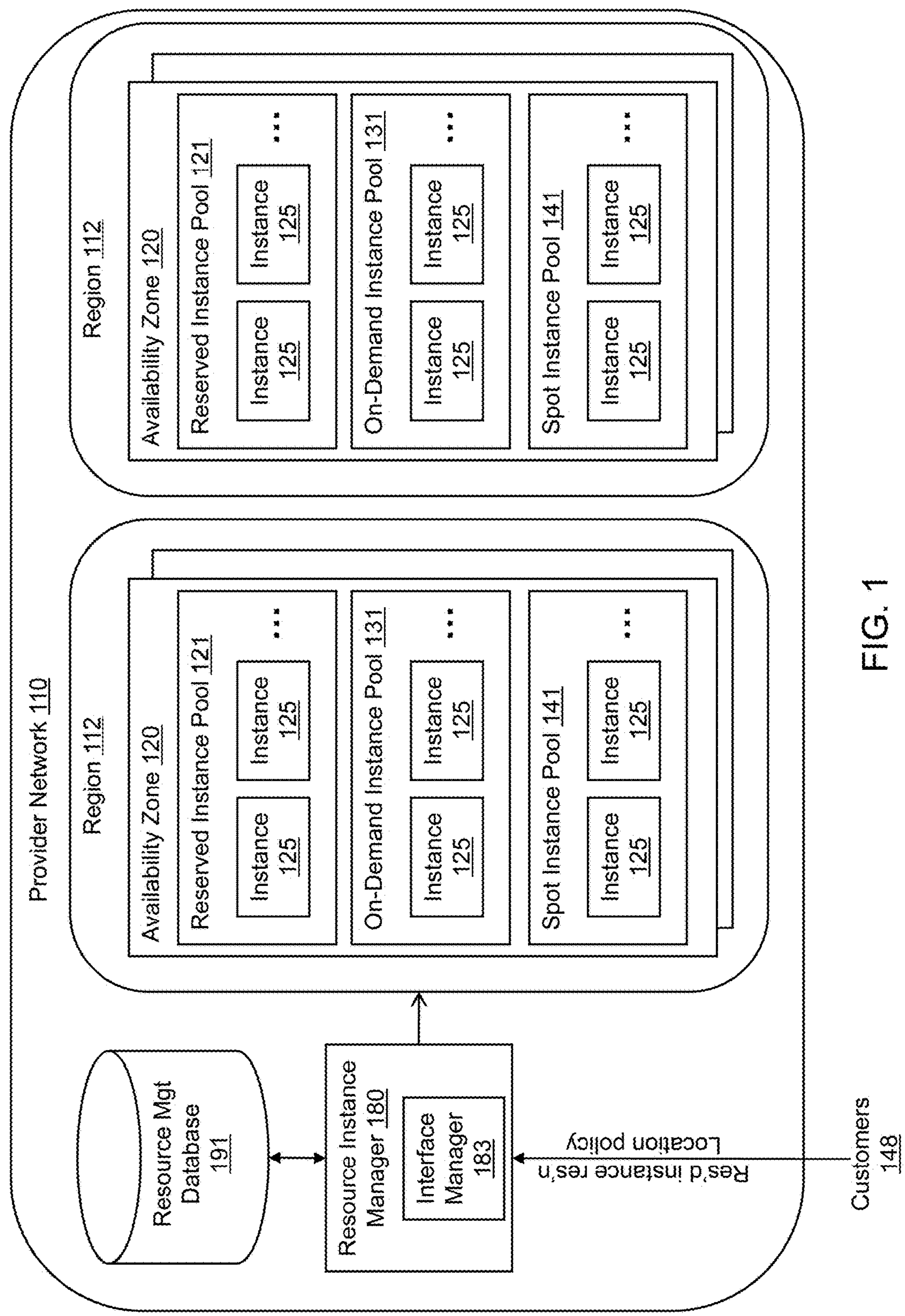
FIG. 1 shows a system in accordance with various examples.

In accordance with various embodiments, systems and methods are described herein in of a service provider network that affords its customers to reserve virtual machines (also termed "virtual machine instances" or "instances"), while also permitting the customers to specify location policies for their reserved instances. A location policy for a reserved instance includes one or more customer-specified placement requirements which limit the computing devices within the provider network on which the reserved instance can be launched. The location policy gives some degree of control to the customer as to the placement of his or her instances at launch time. In some embodiments, a location policy applies to a reservation containing a group of instances.

For example, a customer might want to reserve five instances and have a location policy in which the instances must be launched on different physical computing devices, for example, to minimize or avoid correlated hardware failures from impacting all instances within the reservation. In this example, the customer has reserved five instances which can be launched and terminated by the customer at will during a period of time (e.g., 1 year). During that time, the customer can launch the instances whenever he or she so desires and the provider network will ensure that no two of the instances will be launched on the same physical computing device. In another example, a customer may want to optimize for performance and accordingly specify a location policy that places the instances close together such as on the same server, same rack of servers, etc. Numerous other types of location policies are possible as well.

The provider network also may include a capacity management service and a placement service. The capacity management service analyzes the provider network to help guarantee, or at least increase the likelihood, that when a customer decides to launch one or more of his reserved instances there will be sufficient capacity in the provider network to launch the instance(s) taking into account whatever location policies the customer also may have imposed for the instance(s). For example, upon a customer terminating a reserved instance to which a location policy applies, the capacity management service may determine whether the network includes a sufficient number of empty slots on physical computing devices that can host the terminated instance should the customer decide to re-launch that same instance. The re-launch of the reserved instance might occur on the same slot which was previously vacated or on another comparable slot (e.g., a comparable slot on a different computing device). The capacity management service may determine whether a minimum number of empty slots are available in the provider network for the reserved instance and that comport with the location policy of the reserved instance. For example, if the location policy is that the five instances in a given reservation are to be launched on different racks and four of the five instances are currently launched and active, the capacity management service determines whether there is at least one slot (or perhaps more than a threshold number of slots) in other racks that could host the fifth instance should the customer decide to launch the instance.

If the capacity management service determines that sufficient resources are not presently available in the provider network for a reserved instance given the applicable location policies, the capacity management service may take an action to alter the configuration of the network to create the needed capacity. For instance, the capacity management service might identify a currently occupied slot, but one that otherwise would be satisfactory for a reserved instance given its location policy. The capacity management service in that case could cause the active instance to be migrated from its current slot to a different slot to free up the current slot for possible subsequent use by the reserved instance.

If an idle slot (a slot in which no instance is executing) becomes unavailable due to, for example, the physical hardware such as the server itself being powered off or the launch or migration of an instance into the formerly idle slot, an assessment is made for some or all of the reserved instances that have corresponding location policies as to whether the provider network in its current state could readily accommodate the launch of a reserved instance given its location policy. For example, a particular idle slot may be well-suited to execute a reserved instance from any one of multiple different reservations (e.g., the underlying server hardware is of the correct type for the particular type of reserved instances). That slot becoming unavailable may have a detrimental impact on idle instances whose reservations whose location policies are such that the reserved instances might have been launched in that slot. Thus, upon removing an idle slot from possible use to launch reserved instances with corresponding location policies, some or all of the location policies may be analyzed to determine whether the provider network has sufficient remaining capacity of appropriate idle slots to honor all such location policies if and when a customer decides to launch the reserved instances.

FIG. 1 illustrates a system 100 in accordance with at least some embodiments. The system 100 includes a provider network 110 comprising a plurality of geographical regions 112. Each geographical region 112 may include one or more availability zones 120. An availability zone may also be thought of as a logical data center and could map to one or more physical data centers. Each availability zone 120 in turn may include a plurality of resource instances 125. A resource instance may be a virtual machine which runs on a physical server. The resource instances may be organized into various resource pools in some embodiments, such as a reserved instance pool 121, an on-demand instance pool 131, and an interruptible instance pool 141 (also termed and shown in FIG. 1 as a spot instance pool). The various resource instances 125 in the different availability zones 120 may be reserved and/or allocated for use by customers 148 (e.g., customers of the operator of the provider network 110). Although the instances 125 illustrated in FIG. 1 are shown as belonging to availability zones 120, in other embodiments the provider network 110 may be organized differently: e.g., in some embodiments availability zones may not be implemented. Instance pools may be implemented within availability zones in some implementations (e.g., each availability zone may have its own reserved instance pool), while in other implementations an instance pool or sub-pool may span multiple availability zones.

In the illustrated embodiment, system 100 includes a resource instance manager 180 operable to perform a variety of operations in response to requests submitted by customers 148. The resource instance manager 180 may be implemented on one or more servers executing software to perform the operations described herein as attributed to the resource instance manager. In some embodiments, such as those described herein, the resource instance manager 180 may be implemented as various services executing on servers such as the capacity management service and a placement service. An interface manager component 183 of the resource instance manager 180 may in some embodiments implement one or more programmatic interfaces allowing customers 148 to submit requests for resource instances 125 of the various pools 121, 131, 141. For example, the interface manager 183 may receive a request from a customer 148 to purchase reserved instances such as that illustrated in FIG. 1. The resource instance manager 180 processes the reservation request and satisfies the request for the customer from one or more of the reserved instance pools 121 per the requirements encoded into the reserved instance request itself and any location policies specified by the customer as well as explained below.

FIG. 1 also shows a resource management database 191, which in some embodiments may include an identity of each resource instance 125 currently running on behalf of each customer. The information in the resource management database 191 may identify the various reservations of the customers and, if applicable, the location policy specified by a customer for a given reservation. Based on the information in the resource management database 191, the resource instance manager 180 can determine whether the provider network 110 has sufficient capacity to be able to launch all reserved instances given the applicable location policies should the customers of the reservations so choose to launch the reserved instances.

Each instance pool 121, 131, and 141 may have associated resource management and pricing policies which govern, for example, whether a reservation or allocation of a resource instance can be interrupted, whether reservations of one customer can be resold to another, the different types of static and dynamic pricing rates in effect for instances of the pool, and so on. The various types of instance pools 121, 131, 141 may be the same or different between the various availability zones 120 within a region 112 and may be the same or different between the different regions. The pools may represent logical collections or aggregations. For example, the presence of two instances in the same pool or sub-pool may not necessarily imply anything about the physical location of the hardware used for the two instances.

The reserved instance pool 121 includes resource instances that may be reserved by customers 148 as a group for fairly long periods of time, such as one-year terms, three-year terms, etc. by paying a low, one-time, upfront payment for the resource instance, and then paying a low hourly rate for actual use of the instance at any desired times during the term of the reservation. Thus, the customer 148, by making the long-term reservation, may be assured that its reserved instance will be available whenever it is needed. When purchasing a reservation, the customer can specify various options such as the number of instances in the reservation, the type of instances, the length of the reservation period, etc. The customer also can specify a location policy for the reservation of the group of instances. Instances within a reservation are not launched until the customer decides to do so, but because the instances have been reserved, their launch within the provider network is essentially guaranteed.

If a customer 148 does not wish to make a long-term reservation, the customer may instead opt to use on-demand instances from the on-demand instance pools 131. The pricing policy for the on-demand instance pools 131 may allow the customer 148 to pay for resource capacity by the hour with no long-term commitment or upfront payments. The customer 148 may decrease or increase the resource capacity used, based on application needs, and may only pay the hourly rate for the instances used.

The spot instance pools 141 provide another type of resource purchasing and allocation model. The price of instances in a given spot instance pool 141 varies with supply and demand effects. Instances from any of the spot instance pools 141 can be purchased for a guaranteed maximum price in that the customer specifies the maximum price (the "bid price") that the customer is willing to pay. If the bid price equals or exceeds the current spot price for a desired instance, the instance is activated and assigned for exclusive use by the customer. Thus, the customer knows the upper limit that he will have to pay for a given spot instance. However, spot instances are interruptible in that the spot price may eventually exceed the bid price. If and when that happens, the spot instance is terminated.

In some embodiments, the service provider offers different types of instances to its customers. Instances of different types may vary in terms of their mix of central processing unit (CPU), memory, network ports, etc. The provider network 110 may include computing devices such as servers that are dedicated to host specific instance types. That is, each type of server may host a specific type of instance. If the service provider offers, for example, eight different types of instances, the provider network includes eight different types of servers.

When a customer purchases a reservation, the customer, through the interface manager 183, can specify the type of instances desired, the number of instances to be included in the reservation, the availability zone(s) in which the customer wants the instances to be launched, etc. As noted above, the customer also can specify a location policy. The location policy may include one or more requirements which indicate physical computing devices within the provider network that may or may not be used to host the customer's reserved instances when they are launched by the customer. A location policy may include at least one or both of an instance proximity requirement and a cotenant requirement. An instance proximity requirement may be that reserved instances of a given reservation should be launched "close" together (e.g., on the same physical computing device, in the same rack, etc.) or that the reserved instances should not be launched close together (e.g., on servers housed in separate racks).

In one example of a location policy, to reduce the risk of correlated failures (e.g., a power supply or switch in a rack failing thereby impacting all servers in that rack), an instance proximity requirement of the location policy may include a proximity value that specifies that the instances of the reservation must be launched in servers housed in different racks. In another example, to reduce latency (and thus increase performance), the proximity value could require the instances of the reservation to be launched on the same server or in the same rack. By way of an example of a cotenant requirement, a location policy might be that the customer's reserved instances cannot be launched on a server in which other instances of other customers having certain specified characteristics are also being hosted. For example, a customer might not want his reserved instance to be launched on the same server as another customer who has less than two employees and has not downloaded and installed the latest security patches for his guest operating system (i.e., a potentially untrustworthy cotenant), or a customer whose traffic averages more than a threshold number of packets per second (e.g., a customer that has high enough traffic to/from his instance so as to possibly cause resource starvation problems for other instances hosted on the same server). The above are examples of possible location policies. Other location policies are possible in other embodiments.

Figure 2:
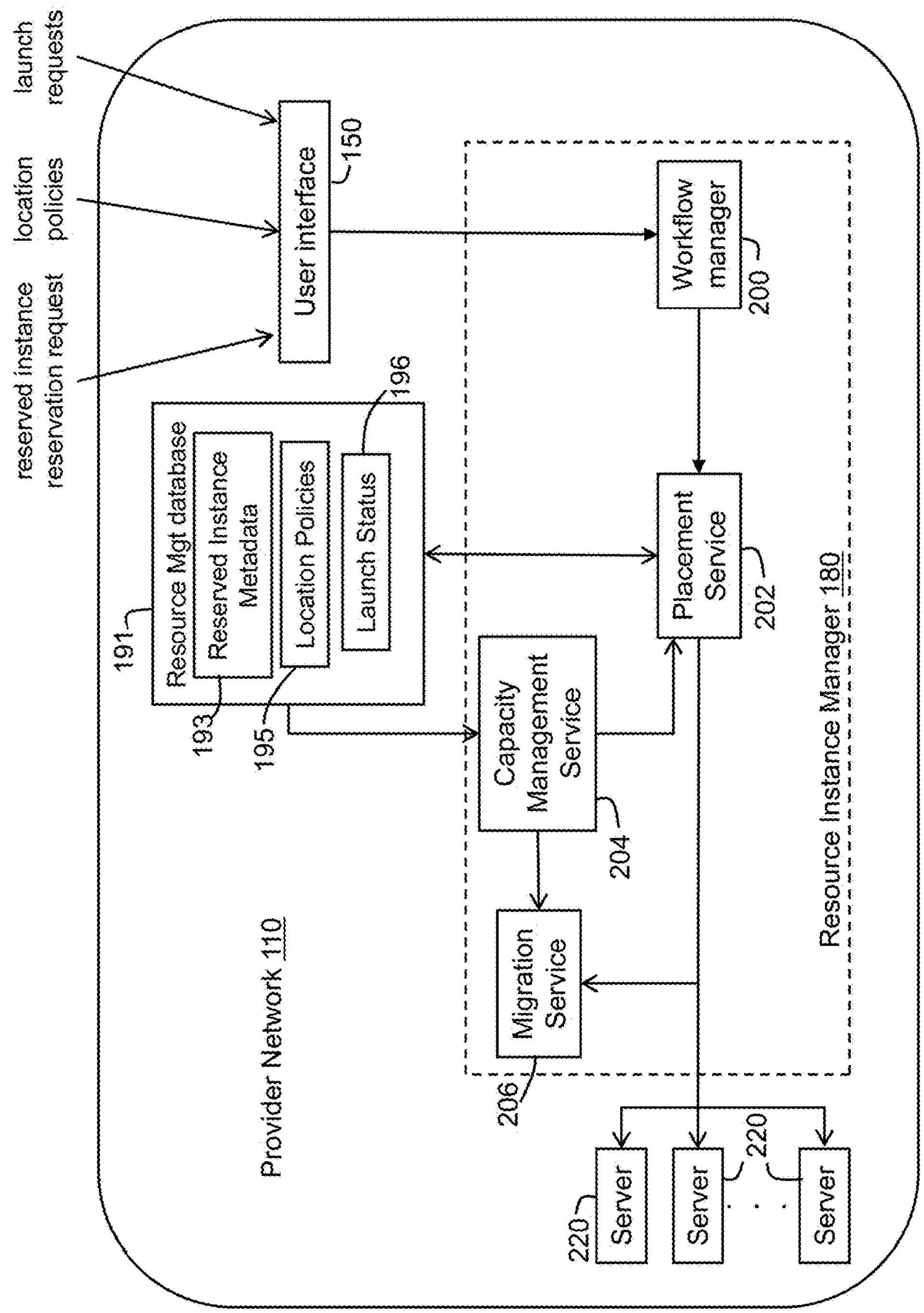
FIG. 2 shows a further illustrative implementation of the system of FIG. 1 in accordance with various examples.

FIG. 2 shows a further example of the provider network 110 of FIG. 1. In the example of FIG. 2, the provider network 110 includes the resource instance manager 180, servers 220, resource management database 191, and a user interface 150. Each server 220 includes one or more processors, memory, network ports and other hardware. The servers 220 may be housed in equipment racks. The servers 220 may also execute a hypervisor and/or virtual machine monitor to support the execution of virtual machine instances. The resource management database 191 may be a data structure stored on a storage device such as a network attached storage device.

The resource instance manager 180 in the example of FIG. 2 includes a workflow manager 200, a placement service 202, a capacity management service 204, and a migration service 206. Different or additional components may be included as well to implement the resource instance manager 180. Each of the workflow manager 200, placement service 202, capacity management service 204, and migration service 206 may be implemented as software executing on hardware such as server.

The user interface 150 permits customers to submit instance management requests to have virtual machine instances created, edited, deactivated, and otherwise managed. For example, through the user interface 150, a customer may purchase a reservation for one or more reserved instances from reserved instance pool 121. The user interface 150 may comprise a collection of hardware resources such as processors and memory to generate and provide web pages to a customer for display on a browser running on the customer's computing device (e.g., desktop computer, notebook computer, tablet device, smart phone, etc.). Through the web pages provided by the user interface 150, the customer is able to interact with the service provider's network to reserve instances, subsequently launch and deactivate the reserved instances, as well as create, terminate and manage other types of instances such as on demand instances and spot instances from the on-demand instant pool 131 and spot instance pool 141, respectively. Other types of user interface 150 are possible as well such as a command line interface or a script execution engine.

The workflow manager 200 is operatively coupled to the user interface 150 and receives requests from the customers to create and manage reserved and other types of instances, as well as other types of customer requests. The workflow manager 200 processes such requests. In one example, the workflow manager 200 determines that the customer has requested to obtain (e.g., purchase) one or more reserved instance. The workflow manager 200 forwards the customer's request for the reserved instance reservation or otherwise generates a series of workflow commands, messages, and/or state change requests to be sent to the placement service 202 to initiate the process of reserving the instance as requested by the customer. Reserving instances for a customer may entail allocating reserved instances from the reserved instance pool 121 to the account associated with the customer. For example, the customer's account may be designated as having the requested number of reserved instances, and the resource management database 191 is updated to reflect that the number of reserved instances allocated to the customer is no longer available in the reserved instance pool 121. Further, the customer may then submit a request to the user interface 150 and thus to the workflow manager 200 that one or more of the reserved instances are to be launched on a server 220. The work flow manager 200 issues one or more commands and messages to the placement service 202 to effectuate the launch of the reserved instance(s).

In accordance with various embodiments and as noted above, a customer can create a location policy for a particular reservation of reserved instances. The location policy may be created through interaction by the customer with the user interface 150. In some embodiments, the user interface 150 provides a web page containing selection options (check boxes, drop-down menus, etc.) which the customer can select to implement a desired location policy. In other embodiments, the customer may submit a free form character string to the user interface, perhaps according to a defined syntax, to create the location policy, or submit an application programming interface (API) call containing location policy parameters. In one example, the user interface may provide the user with optimization options which may generate a location policy for the customer. For example, one customer-selectable option may be to minimize correlated hardware failures. If the customer chooses this option, the work flow manager 200 may generate a location policy for the customer in which the instances of the customer's reservation must be launched on separate servers in separate racks. Another customer-selectable option may be to increase performance which may cause the workflow manager to generate a location policy for the customer that the reservation's instances must be launched "close together" (e.g., on same server, same rack, etc.). Such options may be check boxes on a graphical user interface, a graphical slider which the customer can adjust between performance optimization and correlated hardware failure mitigation.

The workflow manager 200 forwards the customer's request for a new virtual machine instance or otherwise generates a series of workflow commands and messages to be sent to the placement service 200 to initiate the process of causing the virtual machine instance to be created as requested by the customer. Based on a variety of factors, such as the location policies discussed herein, the placement service 202 decides on which physical server 220 to launch a new virtual machine instance. Launching a virtual machine instance may include, for example, allocating various hardware resources (e.g., processors, memory, etc.), loading a virtual machine manager, an operating system, and various user-space applications. A virtual machine image may be selected by a customer to be used to dictate the desired elements of the virtual machine. The placement service 202 selects a particular server 220 and then causes the virtual machine instance to be launched on the selected server. The placement service 191 also may store information in the resource management database as to which specific slot in which specific server 220 is now occupied with a newly launched instance. A slot is an execution environment for an instance and may include resources such as memory, a processor, a guest operating system, a hypervisor, and other resources for the execution of the instance. If an instance is terminated—either voluntarily by a customer, involuntarily such as a spot instance whose spot price exceeds the bid price, or for any other reason—the placement service 202 also updates the resource management database 191 to reflect that available slot.

As explained above, the location policy permits the owner of the reserved instances to control, to a degree, on which hardware (e.g., servers), the reserved instances will launch when the customer so chooses to launch an instances from the reservation. The placement service 202 may store metadata about each reservation as reserved instance metadata 193 within the resource management database 191. Each set of metadata for a corresponding reservation may include such information as a customer account identifier, the type of instances in the reservation, the number of reserved instances, the time duration of the reservation (e.g., one year, two years, etc.), etc. The placement service 202 also may store location policies 195 created by the customers in the resource management database 191. In other embodiments, other services such as the workflow manager 20 may store the reserved instance metadata 193 and location policies 195 in the resource management database 191. The resource management database 191 may also launch status information 196 that is indicative of the launch status of the customers' instances. In one example, launch status may be "idle" to indicate that the instance is not currently loaded and executing on a server or "active" to indicate that the instance is loaded and executing on a server. Different or additional status designators may be implemented as well.

When a customer elects to launch one or more of the reserved instances of a reservation, the work flow manager 200 receives the launch request from user interface 150 and sends one or more messages to the placement service 202 to launch the targeted reserved instance. The placement service accesses the reserved instance metadata 193 and, if applicable, a location policy 195 corresponding to the reservation from the resource management database 191. From that information, the placement service 202 is now aware of the type of instance to be launched and, if it has one, its location policy. Information can be retrieved from the resource management database 191 indicative of which slots are available in the provider network and the types of servers providing the available slots. Being informed of the available slots and the types of servers providing the available slots, the placement service 202 can determine if a suitable slot is available to host the desired reserved instance given the corresponding location policy.

In some embodiments, such as that of FIG. 2, a capacity manager 204 is provided to assess whether the provider network has sufficient capacity to launch all reserved instances should the customers of the reserved instances choose to do so. The assessment may be performed multiple times as explained below. The capacity management service 204 may have access to the resource management database and thus to the reserved instance metadata 193 and location policies 195. To assess whether a given idle reserved instance having a corresponding location policy can be successfully launched into the provider network, the capacity management service 204 examines the reservation from reserved instance metadata 193 and corresponding location policy 195 to determine if the network can launch all presently idle reserved instances for that reservation. For example, the capacity management service 204 may determine the present occupancy status of the provider network such as which slots on which servers 220 are available to host an instance and which are occupied with active instances. Such information may be retrieved from or otherwise provided by the resource management database 191. For the reservation, the capacity management service can also determine whether any instances are currently in an idle state—if all instances are actively executing on servers 220 then no analysis of the reservation and location may be needed. However, if at least one instance in a reservation having a location policy is currently in an idle state, if the capacity management service 204 determines that the provider network would not be able to launch a reserved instance without violating the location policy, the capacity management service 204 may take an appropriate action. In one example, the action might be to request the migration service 206 to migrate another instance from an otherwise suitable slot to a different slot to free up the former slot for the reserved instance. In another example, the capacity management service 204 may generate an alert to prompt a human to add additional hardware to the provider network. The alert could be a pop-up message on a management console, an email, a text message, an audible indicator, other type of alert, and the human may install and/or power on additional servers 220. In some embodiments, the capacity management service 204 may automatically power-up, or cause to be powered up, otherwise idle servers 220 or racks of servers.

FIGS. 3*a*-3*d* show an operational example of how the provider network (e.g., placement service 202, the capacity management service 204, and the migration service 206) can react to a launch request for a reserved instance having a location policy. The particular example illustrated in FIGS. 3*a*-3*d* is of a five-instance reservation (i.e., five reserved instances) with a corresponding location policy that requires the five instances to be launched on five separate equipment racks. The figures show a time sequence of events. Each figure shows five equipment racks 250, 252, 254, 256, and 258. Each equipment racks 250-258 may house multiple servers 220 and each server 220 may execute one or more virtual machine instances. The 16 small squares of each equipment rack represents a "slot" in which an instance may execute. Each rack includes 16 slots but the number of slots may be smaller or greater than 16 and may differ from rack to rack.

Within each rack, some of the slots are white, some are black and some are grey. The white slots designate empty slots, that is, a slot that currently does not have an active instance running in it. The grey and black slots designate slots that do have active instances running in them. In this example, the 5 reserved instances of the reservation are the 5 black slots 260, 262, 264, 266, and 268. The grey slots are instances other than the 5 instances of the reservation. The grey instances could be other instances of the same customer who owns the 5 reserved instances. For example, the grey instances could be other reserved instances of different reservations, or the grey instances could on-demand or spot instances. Further, the grey instances could belong to other customers.

Figures 3A, 3B, 3C, 3D:
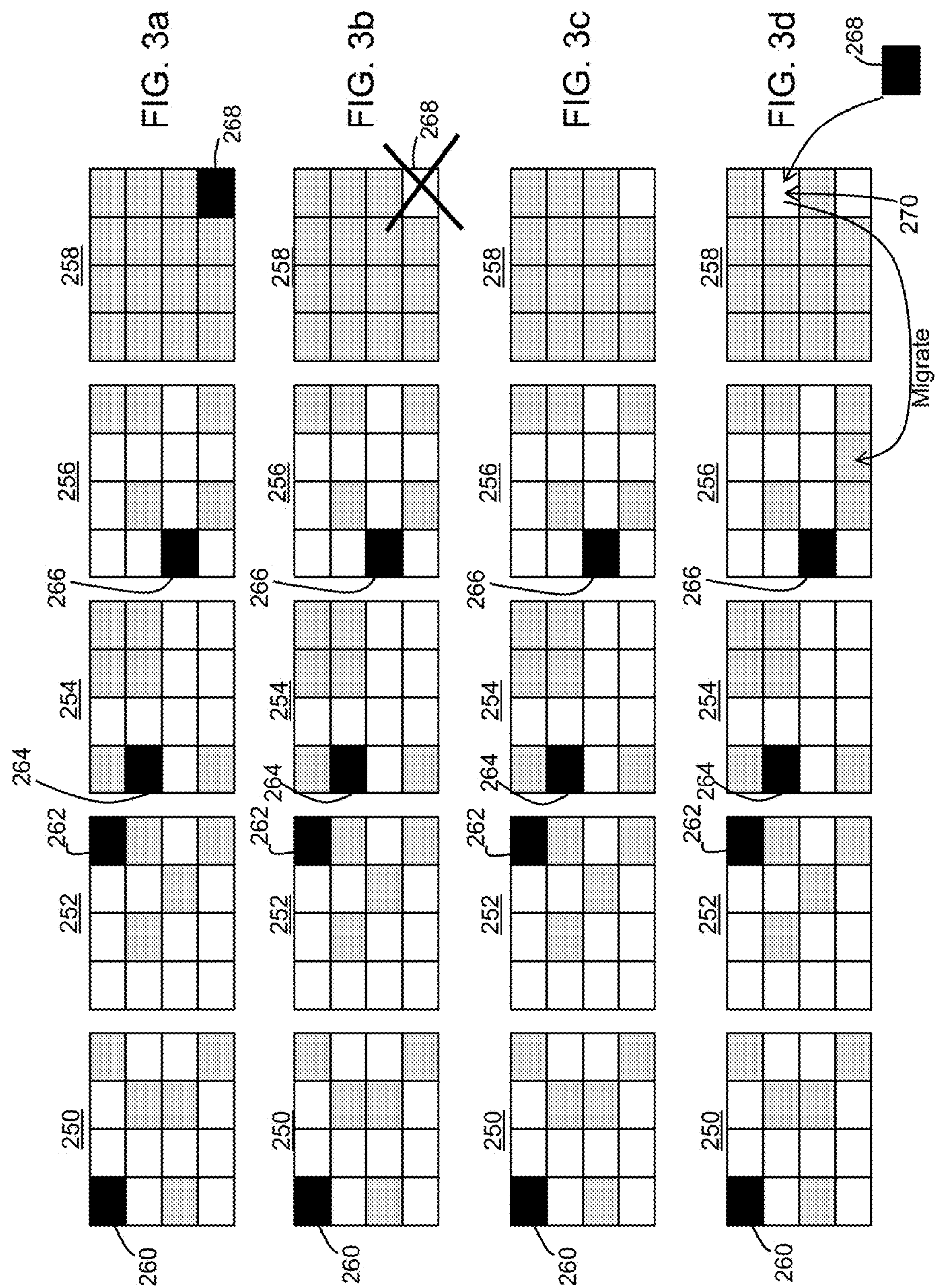
FIGS. 3*a*-3*d* illustrate an operational example of how the provider network can ensure it will have sufficient capacity to honor all requests for launching reserved instances in accordance with various examples.

In this example, the location policy is that, when launched, the reserved instances must be executed in servers on five different racks. FIG. 3*a* illustrates that the five reserved instances of the reservation are launched and executing on the five separate racks 250-258. In FIG. 3*b*, the large "X" drawn through reserved instance 268 indicates that the customer has decided to terminate that instance. As a result, the remaining four reserved instances 260-266 remain executing on servers in racks 250-256. The slot in which reserved instance 268 had been executing is now vacant as indicated by that slot represented as white in FIG. 3*c*. Thus, in FIG. 3*c*, rack 258 only has one empty slot.

In some embodiments, the capacity management service 204 is triggered by the placement service 202 to assess the provider network's ability to launch all reserved instances when instances are launched and/or deactivated. For example, when the reserved instance 268 was terminated in FIG. 3*b*, at that point in time, the placement service 202 may send a message to the capacity management service 204 that a reserved instance has been terminated. The capacity management service 204 could reserve the slot for a future launch of instance 268. However, in other embodiments, the empty slot previously hosting instance 268 may not be exclusively reserved for instance 268 and instead is made available to other instances such as reserved instances in other reservations, on-demand instances, etc. In such cases, the capacity management service 204 may cause the migration service 206 to migrate an instance from rack 258 to another rack (e.g., rack 256) to free up two empty slots in rack 258 and thus to increase the probability that a slot will be available when the customer decides to relaunch instance 268. Of course, other location policies are evaluated by the capacity management service 206 and one or more other location policies may be satisfied as well by instances being launched in rack 258. Thus, the capacity management service 204 may migrate one or more instances from rack 258 in order for the placement service 202 to be able launch other instances while satisfying their applicable location policies. Some instances currently executing on rack 258 could be executed in other slots in different racks without violating any restrictions on such instances. For example, an on-demand instance that needs only to execute on a particular type of server 220 may be migrated from one server to another server of the same type.

FIG. 3*d* illustrates that the migration service 206 has migrated away an instance from slot 270 in rack 258 to an empty slot in rack 256 to thereby free up slot 270 in rack 258 potentially to be used to host a reserved instance (e.g., reserved instance 268). The migration of the instance from slot 270 may be implemented as a "live migration" during which the instance remains operational and capable of receiving and responding to incoming packets. The customer of reserved instance 268 may request instance 268 to be relaunched and the placement service must launch the instance in rack 258 due to the location policy. Rack 258 has two available slots, either of which may be satisfactory for hosting instance 268, and the placement service 202 cause instance 268 to be launched in slot 270 as shown.

Figure 4:
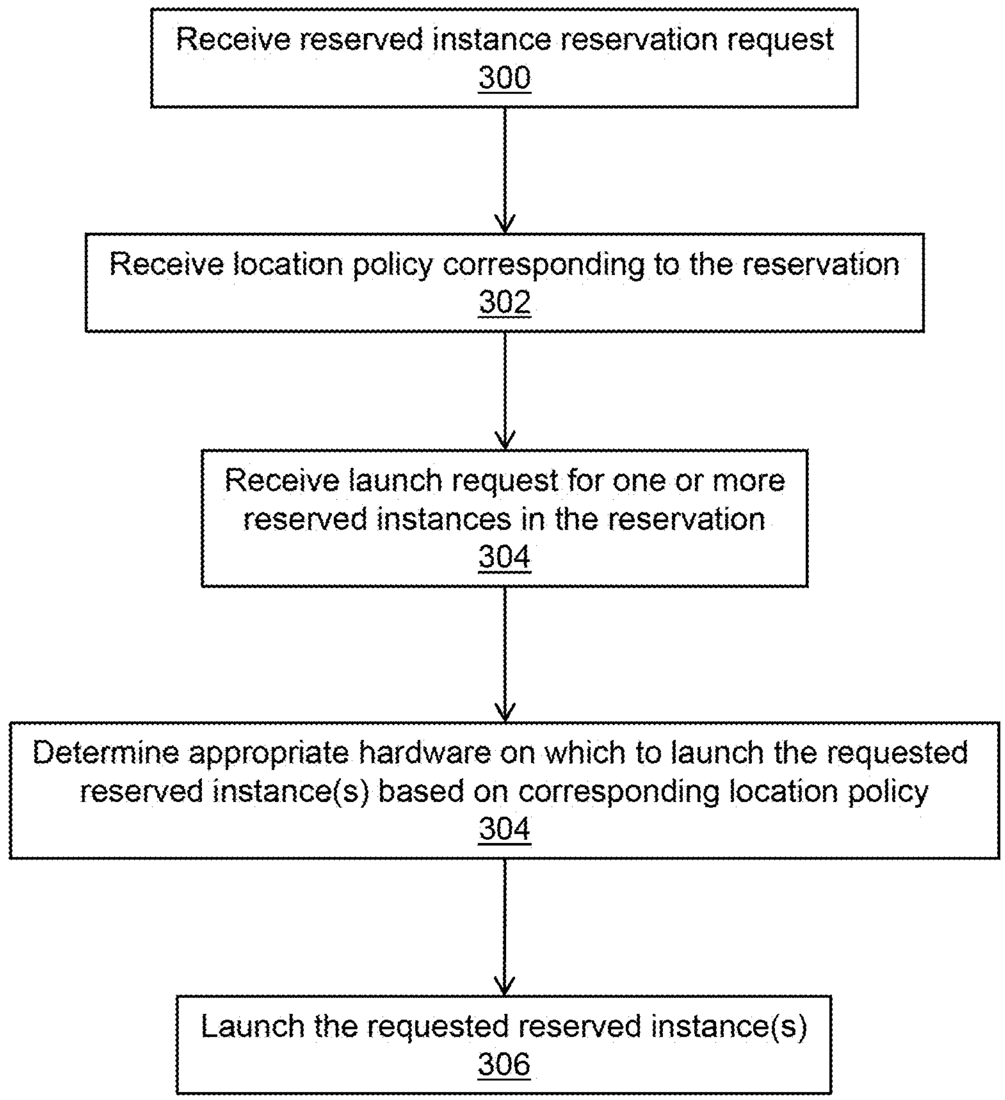
FIG. 4 shows an example of a method that may be implemented in systems such as the systems of FIGS. 1 and 2.

FIG. 4 shows an example of a computer-implemented method in accordance with various embodiments. The operations shown may be performed in the order shown or in a different order, and two or more of the operations may be performed concurrently. At 300, the method includes receiving a reserved instance reservation request. The request may be submitted by a customer through interface manager 183 (FIG. 1) or user interface 150 (FIG. 2), and thus the interface manager 183 and/or user interface 150 receive the reservation request. In other embodiments, the request is received by the workflow manager 200 or placement service 202. The request may specify multiple elements such as the type of instances to be reserved, the number of instances to be reserved, and the length of the reservation.

At 302, the method may include receiving a location policy corresponding to the reservation. The location policy may be provided by a customer through interface manager 183 or user interface 150 and thus be received by those interfaces, as well as by the workflow manager 200 or the placement service 202. The location policy may comprise metadata that describes restrictions as to which hardware may or may not host the corresponding reserved instances. Examples of such location policies are provided above. The received reservation request and location policy may be stored in the reserved instance metadata 193 and location policies 195, respectively, of the resource management database 191.

At 304, a request is received to launch one or more of the reserved instances of the reservation. The request may be provided by the customer through the interface manager 183 or user interface 150 and thus may be received by the workflow manager 200 and/or the placement service 202. The request may be to launch a reserved instance from a reservation to which a location policy has been created.

At 306, the placement service 202 then launches the requested reserved instance while honoring the corresponding location policy. As explained above, the capacity management service 204 may help to ensure that sufficient capacity is present in the provider network to successfully launch the reserved instance when the customer desires to have the instance launched and become active. The instance capacity management service 204 may have taken various precautions such as migrating instances to ensure sufficient capacity is present.

Figure 5:
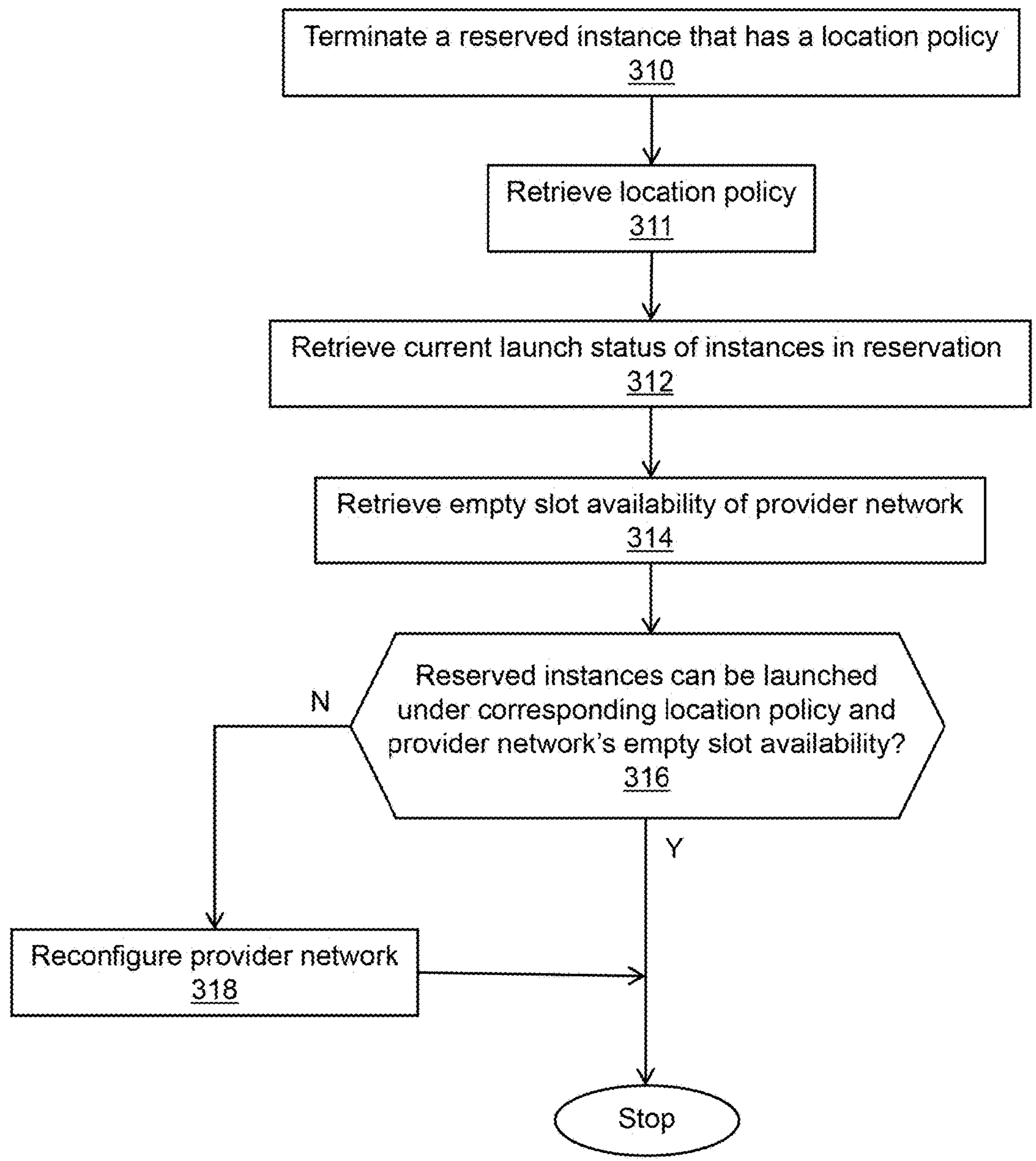
FIG. 5 shows an example of a method by which a capacity management service updates a capacity assessment based on a termination of a reserved instance in a provider network.

FIG. 5 shows an example of a computer-implemented method in accordance with various embodiments by which the capacity management service 204 helps to ensure the provider network will have sufficient capacity to honor a location policy corresponding to a reservation for which an instance has been terminated. Termination of a reserved instance having a corresponding location policy means that the provider network should have sufficient capacity (e.g., idle slots) to be able to accommodate a re-launch of the instance. Of course, the slot in which the instance was terminated could be exclusively reserved for that one instance, but if the slot is not to be reserved for the instance, then the operations of FIG. 5 provide an example of how the capacity management service 204 may react. The operations shown may be performed in the order shown or in a different order, and two or more of the operations may be performed concurrently.

At 310, a reserved instance having a corresponding location policy is terminated. The termination may be caused by the customer who owns the reserved instance. For example, the customer may not need use of the instance for a particular period of time, but might want to re-launch in the now idled instance at a later point in time.

At 311, the capacity management service 204 may retrieve the location policy corresponding to the terminated instance from the location policies 195 within the resource management database 191. The retrieved policy may include metadata, or other type of data, that specifies restrictions as to which hardware or locations in the provider network the corresponding reserved instances can be launched.

At 312, the capacity management service 204 may retrieve the current launch status of instances in the reservation whose instance was terminated. Of course, the launch status of the instance terminated at 310 is known (the instance is now idle), but the reservation could have other instances and one or more of those instances may be idle as well. The current launch status may indicate which instances within the reservation are actively executing and on which slot, server, rack, or other physical hardware division (e.g., bricks, spines, etc.) within the provider network such instances are executing. The launch status may be retrieved by the capacity management service 204 from launch status 196 of the resource management database 191 and/or may be derived from information obtained from the resource management database 191.

At 314, the method includes retrieving empty slot availability information of the provider network. Such information also may be stored in, or otherwise derived from, the resource management database 191. For example, the resource management database 191 may indicate which slots are presently occupied by active instances. The capacity management service 204 may be programmed with data that specifies all of the possible slots in the provider network, and thus the capacity management service 204 can determine which slots are empty and thus still available from occupied slot data retrieved from the resource management database 191.

At 316, the method includes determining whether the instance terminated at 310, as well as other, if any, idle instances of the reservation whose instance was terminated at 310, can be launched under the location policy and the network's current empty slot availability status (obtained or otherwise determined at 314). This determination is specific to the particular location policy. In the example provided above in which the reservation is for five reserved instances and the location policy is that no two or more instances of the reservation can be launched on servers 220 within the same equipment rack, the capacity management service 204 may determine whether sufficient slots are available in different racks. Some slots may only be able to accept a particular type of instance and thus the determination of 332 may entail not only a consideration of the applicable location policy, but also an assessment of the types of slots that are available viz-a-viz the type reserved instances in the reservation.

If sufficient capacity exists in the provider network (e.g., enough slots of the correct type and location), then evaluation stops. However, if at 316, the capacity management service 204 determines that insufficient capacity exists in the provider network to be able to successfully launch all instances of the reservation given the corresponding location policy, then at 318, the capacity management service 204 may reconfigure the provider network, or cause the provider network to be reconfigured to provide sufficient additional capacity. In some examples, the capacity management service 204 may request the migration service 206 to migrate one or more instances to free up certain slots that then provide sufficient capacity to honor a request to launch the reserved instances. In some embodiments, a spot instance may be terminated (with no migration) to make room for reserved instances. For example, a spot instance may be selected for termination whose spot price is within a small range of the customer's bid price, that is, a spot instance that is likely to be terminated anyway due to price fluctuations. In other examples, the capacity management service 204 may submit a message to request additional hardware such as individual servers and/or racks of servers to be powered on to provide additional capacity. The capacity management service 204 may also generate alerts to be provided to humans to request human intervention to provide additional capacity.

If reconfiguring the provider network is to entail migrating an instance from one server to another (e.g., from a server in one rack to a server in a different rack), the migration will involve essentially terminating the instance on one server and launching it in idle slot on another server. The idle slot then will be unavailable for executing other instances such as reserved instances having an associated location. Rendering the idle slot unavailable for reserved instances could make it less likely to be able to successfully launch a reserved instance that might have been relying on that particular slot for its launch. Accordingly, in one embodiment, if an instance is to be migrated to free up sufficient capacity for a given location policy, some or all of the remaining location policies may be evaluated in light of the slot that is to receive the migrated instance becoming unavailable. In one example, a slot may be identified to receive a migrated instance for which no location policy of any of the reserved instance would otherwise need. Each of the idle slots in the provider network can be compared to the applicable location policies, actively running reserved instances, and idle reserved instances to ascertain a slot which no location policy needs or that more than a threshold number of other comparable slots are available.

Figure 6:
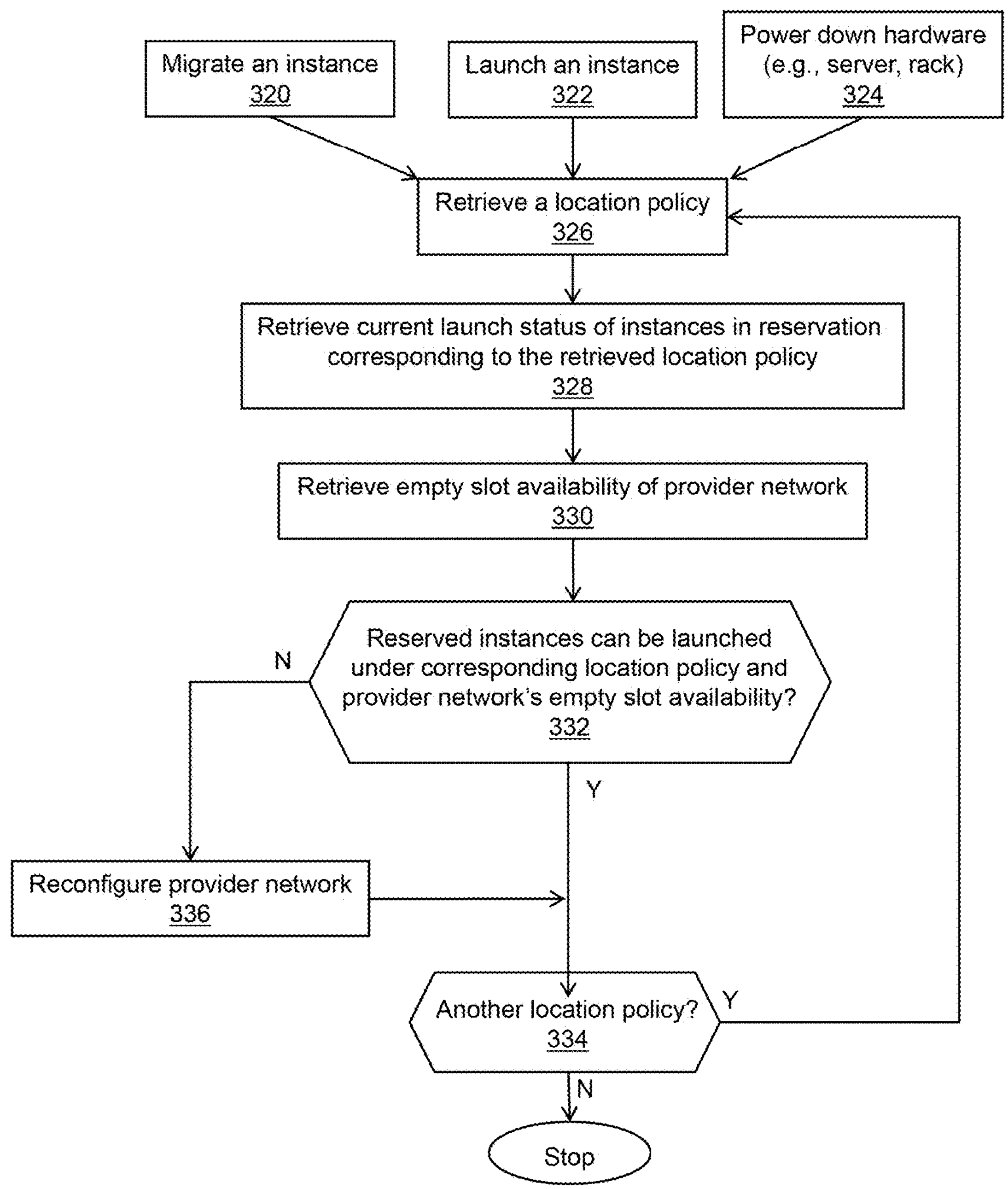
FIG. 6 shows an example of a method by which the capacity management service updates a capacity assessment based on a migration, launch or power off of hardware in the provider network.

FIG. 6 shows another example of a computer-implemented method in accordance with various embodiments by which the capacity management service 204 helps to ensure the provider network will have sufficient capacity to honor all location policies corresponding to the various reserved instance reservations. The operations shown may be performed in the order shown or in a different order, and two or more of the operations may be performed concurrently. The illustrative method of FIG. 6 may be performed by the capacity management service 204 upon an idle instance no longer being idle, thereby potentially decreasing the likelihood that a reserved instance subject to a location policy can be successfully launched.

The capacity management service 204 may be triggered to execute the method upon migration of an instance 320, launch of an instance 322 and/or powering down 324 of instance-hosting hardware such as servers and/or racks of servers. Powering down hardware may occur for a variety of reasons such as maintenance actions, retiring older hardware, energy savings, etc. These events result in a slot that was idle being used to execute an instance and thus no longer being available for other instance such as reserved instance. In some embodiments, each instance migrated or launched or hardware powered down may cause operations 326-336 to be performed, while in other embodiments operations 326-336 may performed less often than for every such event (e.g., every other event 320-322, 324, every third event, etc.).

At 326, the capacity management service 204 may retrieve a location policy from the location policies 195 within the resource management database 191. The location polices 195 may store multiple location policies for multiple reserved instance reservations, and operations 330-336 may be performed for each location policy. The retrieved policy may include metadata, or other type of data, that specifies restrictions on which hardware in the provider network the corresponding reserved instances can be launched.

At 328, the capacity management service 204 may retrieve the current launch status of instances in the reservation corresponding to the retrieved location policy. The current launch status may indicate which instances within the reservation are actively executing and on which slot, server, rack, or other physical hardware division (e.g., bricks, spines, etc.) within the provider network such instances are executing. The launch status may be retrieved by the capacity management service 204 from the resource management database 191 (launch status 16) and/or may be derived from information obtained from the resource management database 191.

At 330, the method includes retrieving empty slot availability information of the provider network. Such information also may be stored in, or otherwise derived from, the resource management database 191. For example, the resource management database 191 may indicate which slots are presently occupied by active instances. The capacity management service 204 may be programmed with data that specifies all of the possible slots in the provider network, and thus the capacity management service 204 can determine which slots are empty and thus still available from occupied slot data retrieved from the resource management database 191.

At 332, the method includes determining whether the reserved instances of the reserved instance reservation corresponding to the location policy retrieved at 326 can be launched under the location policy and the network's current empty slot availability status (obtained or otherwise determined at 330). This determination is specific to the particular location policy. In the example provided above in which the reservation is for five reserved instances and the location policy is that no two or more instances of the reservation can be launched on servers 220 within the same equipment rack, the capacity management service 204 may determine whether sufficient slots are available in different racks. As explained above, some slots may only be able to accept a particular type of instance and thus the determination of 332 may entail not only a consideration of the applicable location policy, but also an assessment of the types of slots that are available viz-a-viz the type reserved instances in the reservation. The determination made at 332 may apply to the reserved instances that are not currently launched and active, and those instances can be determined from the current launch status of the reserved instances as retrieved at 328.

If sufficient capacity exists in the provider network (e.g., enough slots of the correct type and location), then at 334, the method includes determining whether an additional location policy exists and, if so, looping control back to operation 326 for an iteration of the method for a different location policy. In some embodiments, the location polices (if there is more than one) can be evaluated in a prioritized order. For example, certain customer accounts may be designated with a higher service level or benefits than other customer accounts (e.g., bronze, silver, gold), and the customer accounts with higher designation levels may be evaluated before the lower designation level accounts. The location policies may be stored in the resource management database 191 and thus the capacity management service 204 may determine whether an additional location policy exists by interrogating the database. If no more reserved instance location policies remain to be analyzed per the method of FIG. 5, the processing stops.

However, if at 332, the capacity management service 204 determines that insufficient capacity exists in the provider network to be able to successfully launch all instances with the reservation, then at 336, the capacity management service 204 may reconfigure the provider network, or cause the provider network to be reconfigured. The types of provider network reconfiguring may be the same as those explained above regarding FIG. 5.

Figure 7:
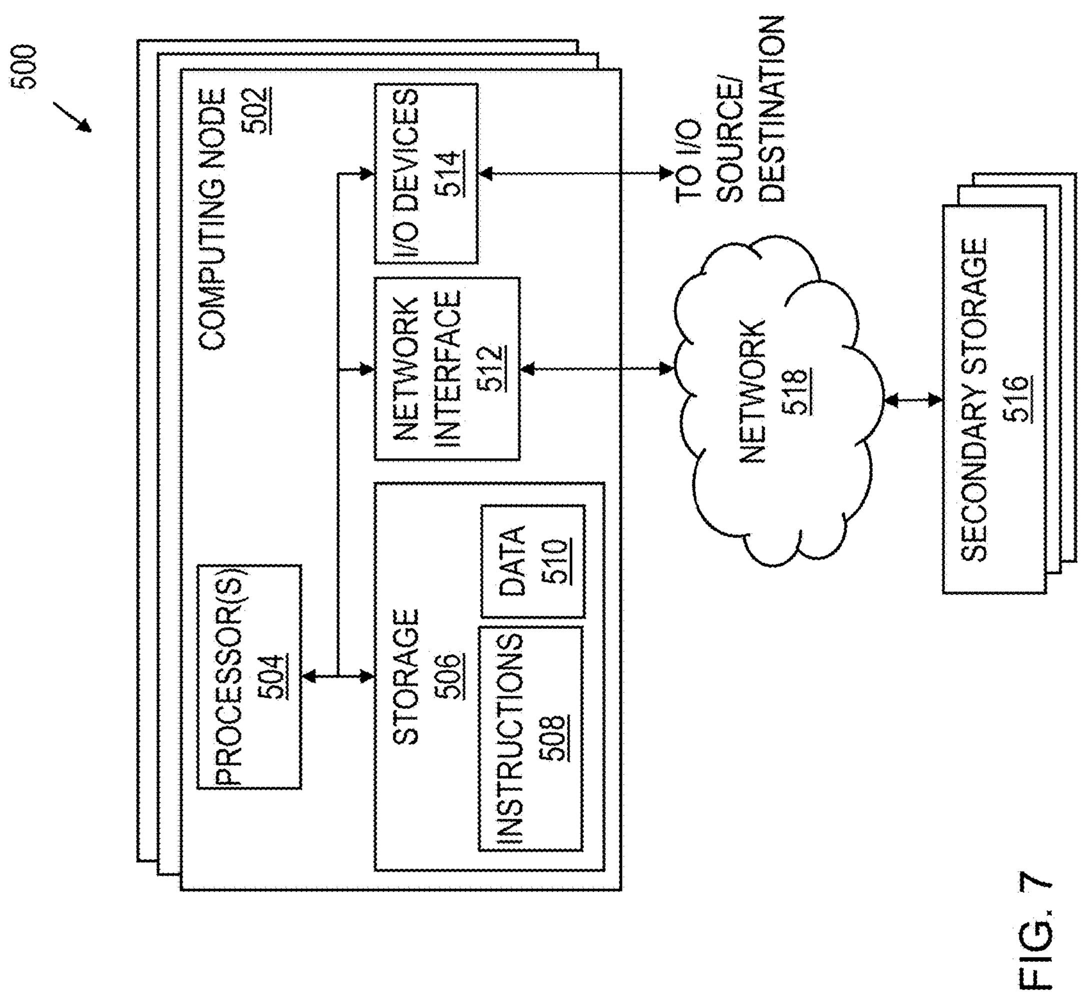
FIG. 7 shows an illustrative architecture of a computing device that can be used to implement the various components of the system described herein in accordance with various examples.

FIG. 7 shows a schematic diagram for a computing system 500 suitable for implementation of the web services platform 102, including the functionality to create and use cotenant policies and trust scores as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the user resource instance manager 180 including the interface manager 183, as well as the user interface 150 and the components of the resource instance manager 180 such as the workflow manager 200, the placement service 202, the capacity management service 204, and the migration service 206.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the resource instance manager 180 including the interface manager 183 and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the resource instance manager 180 and interface manager 183 and other components described herein may be implemented as a separate computing device 502 executing software to provide the computing node with the functionality described herein. In some embodiments, the resource instance manager 180, interface manager 183, and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing device 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:

one or more first computing devices configured to implement a user interface, a capacity management service, and a placement service in a provider network;

wherein the user interface is configured to:

receive a customer-specified reservation for a reserved unlaunched virtual machine instance, the reservation being for a predetermined period of time during which the reserved unlaunched virtual machine instance can be launched and terminated as requested by the customer; and receive a customer-specified location policy for the reservation, the location policy including a customer-provided placement requirement as to which of a second plurality of computing devices is to be used to host the reserved unlaunched virtual machine instance, the location policy including at least one of an instance proximity requirement which indicates a closeness variable that indicates which of the second plurality of computing devices are to be used to launch the reserved unlaunched virtual machine instance and a cotenant requirement which indicates a characteristic of another customer;

wherein the capacity management service is configured prior to launching the reserved unlaunched virtual machine instance to determine that sufficient capacity does not exist on the second plurality of computing devices to execute the reserved unlaunched virtual machine instance of the reservation in compliance with the location policy and to reconfigure the provider network to make sufficient capacity available in compliance with the location policy;

wherein the placement service is configured to determine on which of the second plurality of computing devices to launch the reserved unlaunched virtual machine instance in compliance with the location policy and to launch the reserved unlaunched virtual machine instance on the determined computing device in response to the reconfiguration; and wherein the one or more first computing devices is different than the second plurality of computing devices.

2. The system of claim 1, wherein the capacity management service is configured to initiate a determination as to whether sufficient capacity exists upon termination, launch, or migration of a virtual machine instance within the provider network, or power off of virtual machine instance-hosting hardware in the provider network.

3. The system of claim 2, wherein the capacity management service is configured to determine that an active virtual machine instance should be migrated to make sufficient capacity available in compliance with the location policy and to initiate a migration of the determined virtual machine instance from one of the second plurality of computing devices to another of the second plurality of computing devices.

4. A system, comprising:

a first plurality of computing devices within a provider network and configured to execute virtual machine instances; and a plurality of second computing devices configured to implement a user interface, a capacity management service, and a placement service; wherein the user interface is configured to:

receive a customer-specified reservation for a group of reserved unlaunched virtual machine instances, the reservation being for a predetermined period of time during which the group of reserved unlaunched virtual machine instances can be launched and terminated as requested by the customer; and receive a customer-specified location policy corresponding to the reservation, the location policy including a customer-provided placement requirement as to which of the first plurality of computing devices are to be used to host the group of reserved unlaunched virtual machine instances;

wherein the placement service is configured to determine a computing device of the first plurality of computing devices on which to launch the group of reserved unlaunched virtual machine instances based on the location policy;

wherein the capacity management service is configured to determine, prior to launching the group of reserved unlaunched virtual machines, that sufficient capacity does not exist on the first plurality of computing devices to execute the group of reserved unlaunched virtual machine instances of the reservation in compliance with the location policy and to initiate migration of an active virtual machine instance on the first plurality of computing devices to make sufficient capacity available in compliance with the location policy;

wherein the placement service is further configured to launch the group of reserved unlaunched virtual machine instances on the determined computing device in response to the migration; and wherein the first plurality of computing devices is different than the second plurality of computing devices.

5. The system of claim 4, wherein the capacity management service is configured to reconfigure the provider network by causing a computing device to be powered on upon determining that sufficient capacity does not exist on the first plurality of computing devices.

6. The system of claim 4, wherein the capacity management service is configured to initiate a determination as to whether sufficient capacity exists upon termination, launch, or migration of a virtual machine instance within the provider network.

7. The system of claim 4, wherein the capacity management service is configured to:

retrieve current launch statuses of the group of reserved unlaunched virtual machine instances of the reservation from a database;

retrieve empty slot availability data of the provider network;

determine which reserved unlaunched virtual machine instances of the reservation can be launched based on the empty slot availability data and in compliance with the location policy; and initiate the migration based on a determination that one or more of the reserved unlaunched virtual machine instances of the reservation cannot be launched in compliance with the location policy.

8. The system of claim 4, wherein the location policy includes at least one of an instance proximity requirement which indicates a closeness variable that indicates which of the first plurality of computing devices are to be used to launch the group of reserved unlaunched virtual machine instances and a cotenant requirement which indicates a characteristic of another customer.

9. The system of claim 4, further comprising equipment racks in which the first plurality of computing devices are housed, and wherein the location policy specifies that all of the reserved unlaunched virtual machine instances corresponding to the reservation are to be launched on separate equipment racks.

10. A method, comprising:

retrieving a location policy corresponding to a reservation of a group of unlaunched virtual machine instances;

retrieving empty slot availability information of a provider network, the provider network comprising a plurality of computing devices configured to implement slots in which the group of reserved unlaunched virtual machine instances can be executed, the empty slot availability information indicating at least one empty slot of the implemented slots that is not running an active virtual machine instance;

determining that a reserved unlaunched virtual machine instance of the reservation of the group of reserved unlaunched virtual machine instances to which the retrieved location policy corresponds cannot be launched on an acceptable computing device of the provider network without violating the corresponding location policy;

reconfiguring the provider network to comply with the corresponding location policy; and launching the determined virtual machine instance in the at least one empty slot.

11. The method of claim 10, wherein reconfiguring the provider network includes providing additional capacity to the provider network to execute virtual machine instances by powering up a computing device.

12. The method of claim 10, wherein reconfiguring the provider network includes migrating an active virtual machine instance from a first computing device to a second computing device.

13. The method of claim 10, further comprising, for each of a plurality of location policies, each location policy corresponding to a different reservation, performing each of retrieving the location policy, retrieving the empty slot availability, and determining whether the reserved unlaunched virtual machine instance of the reservation can be launched on an acceptable computing device.

14. The method of claim 10, further comprising:

terminating a reserved unlaunched virtual machine instance of the group of unlaunched virtual machine instances of the reservation; and retrieving statuses of the other reserved unlaunched virtual machines within the reservation;

for each unlaunched virtual machine instance within the reservation, determining whether the unlaunched virtual machine instance of the reservation can be launched on one or more acceptable computing devices.

15. The method of claim 10, wherein determining that a reserved unlaunched virtual machine instance of the reservation cannot be launched on an acceptable computing device without violating the corresponding location policy comprises determining whether a slot on a computing device is empty to launch the reserved unlaunched virtual machine instance in light of a cotenant requirement in the location policy, the cotenant requirement including a characteristic of another customer.

16. The method of claim 15, wherein determining that a reserved unlaunched virtual machine instance of the reservation cannot be launched on an acceptable computing device without violating the corresponding location policy also comprises determining whether a slot on a computing device is empty to launch the reserved unlaunched virtual machine instance in light of an instance proximity requirement.

17. The method of claim 10, further comprising determining on which computing device to launch the reserved unlaunched virtual machine instance based on the location policy as well as a type of the reserved unlaunched virtual machine instance.

* * * * *